US011698463B2

(12) United States Patent
Wei et al.

(10) Patent No.: US 11,698,463 B2
(45) Date of Patent: Jul. 11, 2023

(54) TERMINAL DEVICE, INFRASTRUCTURE EQUIPMENT AND METHODS

(71) Applicants: Sony Corporation, Tokyo (JP); Sony Mobile Communications Inc., Tokyo (JP)

(72) Inventors: Yuxin Wei, Basingstoke (GB); Hideji Wakabayashi, Basingstoke (GB); Anders Berggren, Basingstoke (GB); Vivek Sharma, Basingstoke (GB); Shinichiro Tsuda, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 467 days.

(21) Appl. No.: 16/763,988

(22) PCT Filed: Nov. 9, 2018

(86) PCT No.: PCT/EP2018/080794

§ 371 (c)(1),
(2) Date: May 14, 2020

(87) PCT Pub. No.: WO2019/096698

PCT Pub. Date: May 23, 2019

(65) Prior Publication Data

US 2020/0278451 A1 Sep. 3, 2020

(30) Foreign Application Priority Data

Nov. 15, 2017 (EP) .................................... 17201963

(51) Int. Cl.
*G01S 19/05* (2010.01)
*G01S 19/34* (2010.01)
(Continued)

(52) U.S. Cl.
CPC .............. *G01S 19/05* (2013.01); *G01S 19/34* (2013.01); *H04W 4/20* (2013.01); *H04W 64/00* (2013.01); *H04W 88/02* (2013.01)

(58) Field of Classification Search
CPC ......... H04W 88/02; G01S 19/05; G01S 19/34
See application file for complete search history.

(56) References Cited

U.S. PATENT DOCUMENTS

| | | | |
|---|---|---|---|
| 10,362,556 B2 * | 7/2019 | Muquet | G01S 19/05 |
| 2011/0039578 A1 * | 2/2011 | Rowitch | G01S 13/767 455/456.1 |
| 2015/0153458 A1 | 6/2015 | Syrjarinne et al. | |

FOREIGN PATENT DOCUMENTS

| | | | |
|---|---|---|---|
| CN | 108811007 A * | 11/2018 | G01S 5/0236 |
| WO | 2013/033464 A2 | 3/2013 | |
| WO | 2019/086309 A1 | 5/2019 | |

OTHER PUBLICATIONS

International Search Report and Written Opinion dated Feb. 12, 2019 for PCT/EP2018/080794 filed on Nov. 9, 2019, 10 pages.
(Continued)

*Primary Examiner* — Muthuswamy G Manoharan
(74) *Attorney, Agent, or Firm* — Xsensus LLP

(57) ABSTRACT

A receiver circuitry configured to receive, from infrastructure equipment of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the received signal; and processing circuitry configured: to determine, based on a
(Continued)

characteristic of the SIB, a temporal validity of the received positioning information, and to determine, at a time at which the received positioning information is temporally valid, the spatial position of the terminal device using the received positioning information and the predetermined positioning scheme.

20 Claims, 7 Drawing Sheets

(51) Int. Cl.
*H04W 4/20* (2018.01)
*H04W 64/00* (2009.01)
*H04W 88/02* (2009.01)

(56) References Cited

OTHER PUBLICATIONS

U-BLOX AG, "Discussion on Support for RTK Corrections for High Precision GNSS Positioning," 3GPP TSG RAN WG2 Meeting #98, R2-1705308, Hangzhou, China, May 15-19, 2017, 4 pages.
U-BLOX AG, "Discussion on State Space RTK Corrections," 3GPP TSG RAN WG2 Meeting #99, R2-1708646, Berlin, Germany, Aug. 21-25, 2017, 1 page.
ESA, "GNSS positioning enhancement: ways forward to support SSR concept in Release 15," 3GPP TSG-RAN WG2 #99bis, R2-1710536, Prague, Czech Republic, Oct. 11-15, 2017, 4 pages.
ESA, "GNSS positioning enhancements: detailed description of SSR messages for multi GNSS PPP," 3GPP TSG-RAN WG2 #99bis, R2-1710537, Prague, Czech Republic, Oct. 11-15, 2017, 4 pages.
CMCC, "The positioning assistance data broadcasting," 3GPP TSG-RAN WG2 Meeting #99bis, R2-1711154, resubmission of R2-1708994, Prague, Czech Republic, Oct. 9-13, 2017, 4 pages.
Media Tek Inc., "On structure of SI index ," 3GPP TSG-RAN WG2 Meeting #99bis, R2-1711308, Resubmission of R2-1708042, Czech Republic, Oct. 9-13, 2017, 3 pages.
"MADOCA Real-Time Products," Quasi-Zenith Satellite System, Jun. 13, 2019, 1 page.
ETSI, "Universal Mobile Telecommunications System (UMTS); Radio Resource Control (RRC); Protocol specification," 3GPP Technical Specification 25.331, Version 12.5.0, Release 12, May 2015, pp. 1-2282.
5G, "The Mobile Broadband Standard," 3GPP Specification Series, 36, 6 pages; [Retrieved on May 6, 2020] Retrieved from the Internet:<https://www.3GPP.org/DynaReport/36-series.htm>.
5G, "The Mobile Broadband Standard," 3GPP Specification Series, 38, 3 pages; [Retrieved on May 6, 2020] Retrieved from the Internet: <https://www.3GPP.org/DynaReport/38-series.htm>.

* cited by examiner

TERMINAL DEVICE, INFRASTRUCTURE EQUIPMENT AND METHODS

CROSS-REFERENCE TO RELATED APPLICATIONS

The present application is based on PCT filing PCT/EP2018/080794, filed Nov. 9, 2018, which claims priority to EP 17201963.0, filed Nov. 15, 2017, the entire contents of each are incorporated herein by reference.

BACKGROUND

Field of the Disclosure

The present invention relates to a terminal device, infrastructure equipment and methods.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP ($3^{rd}$ Generation Partnership Project) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

One requirement of future wireless communications networks is to be able to quickly and accurately determine the location of terminal devices of the wireless communication network so as to be able to provide location based services to those terminal devices. The determination of the location (position) of terminal devices in a wireless communications network may be referred to as positioning. Positioning may be carried out by a terminal device based on positioning information transmitted to the terminal device by infrastructure equipment of the network. The positioning information is used with a predetermined positioning scheme (comprising one or more of instructions and additional information for determining the position of the terminal device using the positioning information) by the terminal device in order to determine its position. For example, when the terminal device determines its position using GNSS (Global Navigation Satellite Signals) signals such as Global Positioning System (GPS) signals or the like, the terminal device uses such signals (e.g. the strength and/or quality of each signal received from a plurality of satellites) together with positioning information received from the network (e.g. indicating the position of each satellite) in order to determine its location. With next generation wireless communications networks (such as those referred to as New Radio (NR) or 5G ($5^{th}$ Generation) networks), there is a greater need for reduced network overhead and reduced terminal device power consumption (particularly for low complexity devices such as Internet of Things (IoT) or Machine Type Communications (MTC) devices, which are expected to be widely used in new generation networks). There is therefore a need to determine ways of transmitting positioning information (also referred to as positioning assistance information or assistance information) to terminal devices of the network which help meet these requirements.

SUMMARY

The present technique is defined according to the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
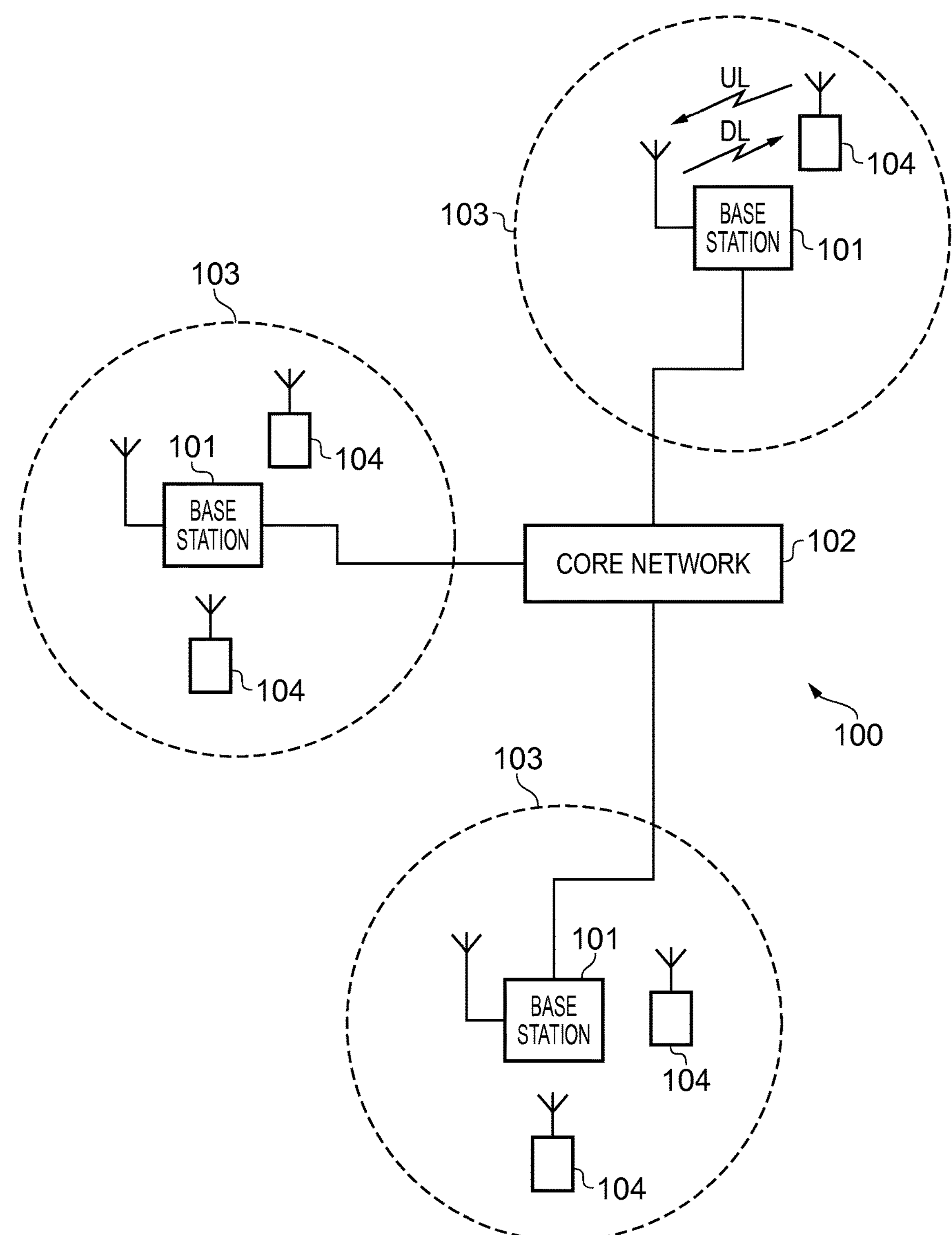
FIG. 1 provides a schematic diagram illustrating some basic functionality of a mobile telecommunications network/system.

Referring now to the drawings, wherein like reference numerals designate identical or corresponding parts throughout the several views.

FIG. 1 provides a schematic diagram illustrating some basic functionality of a mobile telecommunications network/system operating in accordance with LTE principles and which may be adapted to implement embodiments of the disclosure as described further below. It will be appreciated, however, that the use of LTE is only an example, and that the principles of the present disclosure may be applied to other types of wireless communications systems such as UMTS or NR (5G). Various elements of FIG. 1 and their respective modes of operation are well-known and defined in the relevant standards administered by the 3GPP (RTM) body, for example, 3GPP TS36 series [1] for LTE and 3GPP TS38 series for NR [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. A communications device may also be referred to as a mobile station, user equipment (UE), user device, mobile radio, terminal device, terminal and so forth. A base stations may also be referred to as a transceiver station, infrastructure equipment, NodeB (which is a UMTS base station), eNodeB (which is a LTE base station (eNB for short)), gNodeB (which is a NR base station (gNB for short)), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
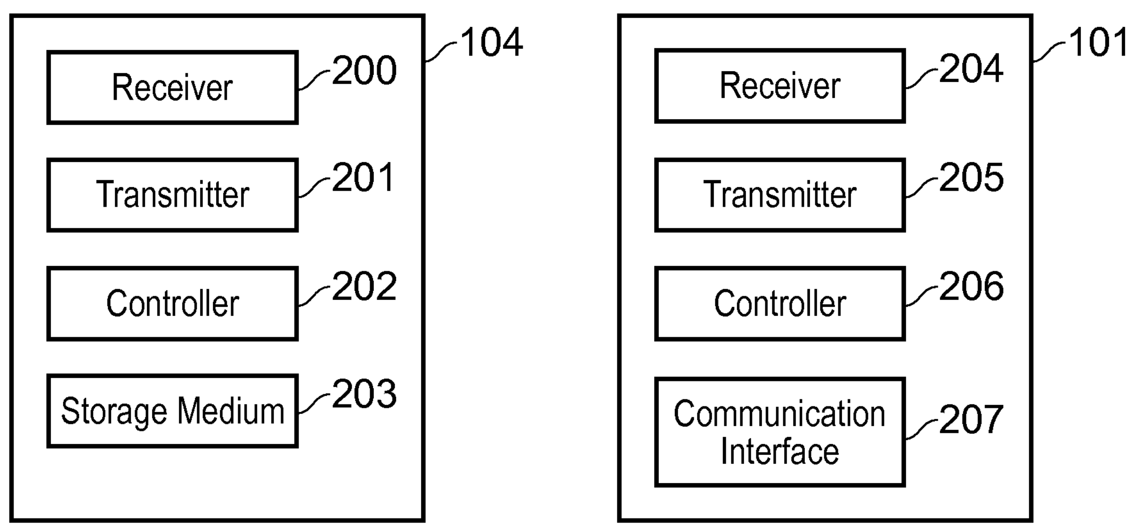
FIG. 2 schematically shows some components of a terminal device and infrastructure equipment according to an embodiment.

FIG. 2 schematically shows some components of a UE 104 and a base station 101 according to an example embodiment.

The UE 104 comprises a receiver 200, a transmitter 201, a controller 202 and a storage medium 203. The transmitter 201 is for transmission of wireless signals (e.g. radio signals) to infrastructure equipment of the wireless telecommunications network. The receiver 200 is for reception of wireless signals (e.g. radio signals) from infrastructure equipment of the wireless telecommunications network. The storage medium 203 is for storage of digital data (and may take the form of solid state storage, for example). The controller 202 is configured to control the receiver 200, transmitter 201 and storage medium 203 to operate in accordance with embodiments of the present disclosure. The controller 202 may comprise various sub-units for providing functionality in accordance with embodiments of the present disclosure as explained further below. These sub-units may be implemented as discrete hardware elements or as appropriately configured functions of the controller 202. The controller 202 may be suitably configured/programmed to provide the desired functionality described herein using conventional programming/configuration techniques for equipment in telecommunications systems. The receiver 200, transmitter 201, controller 202 and storage medium 203 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the UE 104 will in general comprise various other elements associated with its operating functionality, such as a user interface, battery, and the like. In the following embodiments, the receiver 200, transmitter 201 and controller 202 are implemented as circuitry. In particular, the functions of the controller 202 are carried out by processing circuitry comprised within the controller.

The base station 101 comprises a receiver 204, a transmitter 205, a controller 206 and a communication interface 207. The transmitter 205 is for transmission of wireless signals (e.g. radio signals) to a terminal device of the wireless telecommunications network. The receiver 204 is for reception of wireless signals (e.g. radio signals) from a terminal device of the wireless telecommunications network. The communication interface 207 is for transmission of signals to or reception of signals from other infrastructure equipment of the network 100 (such signals being transmitted via the core network 102, for example). The controller 206 is configured to control the transmitter 205, receiver 204 and communication interface 207 to operate in accordance with embodiments of the present disclosure. The controller 206 may comprise various sub-units for providing functionality in accordance with embodiments of the present disclosure as explained further below. These sub-units may be implemented as discrete hardware elements or as appropriately configured functions of the controller 206. The controller 206 may be suitably configured/programmed to provide the desired functionality described herein using conventional programming/configuration techniques for equipment in telecommunications systems. The transmitter 205, receiver 204, controller 206 and communication interface 207 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality. In the following embodiments, the transmitter 205, receiver 204, controller 206 and communication interface 207 are implemented as circuitry. In particular, the functions of the controller 206 are carried out by processing circuitry comprised within the controller.

In an embodiment of the UE 104, the receiver 200 is configured to receive, from the base station 101, a signal comprising positioning information for allowing a spatial position of the terminal device to be determined using the positioning information and a predetermined positioning scheme associated with the positioning information.

The positioning scheme comprises one or more of instructions and additional information for determining the position of the terminal device using the positioning information. For example, in the case that the received positioning information is GNSS positioning assistance information, the positioning scheme comprises instructions (e.g. stored in the storage medium 203 of the UE 104) for determining the position of the UE 104 using that positioning assistance information and additional information in the form of signals received by the UE 104 (via a GNSS receiver (not shown)) from one or more GNSS satellites operating according to the positioning scheme. Various GNSS schemes exist including GPS (mentioned earlier), GLONASS (Globalnaya Navigazionnaya Sputnikovaya Sistema), Galileo, QZSS (Quasi-Zenith Satellite System), etc. Such GNSS schemes may be used in conjunction with schemes such as Real Time Kinematic (RTK) techniques discussed, for example, in [3], [4] or [5]. In any case, it should be understood that the term "positioning information" (or "positioning assistance information") relates to any information required for the UE 104 to determine its position in accordance with a particular positioning scheme. The positioning scheme should be understood to mean any further information or instructions required in order for the UE 104 to determine its position using the received positioning information. The further information and/or instructions of the positioning scheme may be known to the UE 104 in advance (e.g. stored in the storage medium 203) and/or received as signals by the UE 104 (e.g. as GNSS signals from a GNSS receiver (not shown)).

In embodiment, the positioning information received by the receiver 200 is comprised within a system information block (SIB) of the received signal. SIBs are for the delivery of system information to the UE 104 from the network so as to enable data to be transmitted between the network and the UE 104 according to a particular communications standard (such as a suitable Long Term Evolution (LTE) or NR/5G standard). The concept of SIBs for the delivery of system information and the types of system information deliverable by SIBs are known in the art, and will therefore not be discussed in detail here for the sake of brevity. The controller 203 is configured to determine, based on a characteristic of the SIB, a temporal validity of the received positioning information (that is, an amount of time for which the positioning information comprised within the received SIB is valid for determining the position of the UE 1040. At a time at which the received positioning information is temporally valid, the controller 203 is configured to determine the spatial position of the terminal device using the received positioning information and the predetermined positioning scheme.

In an embodiment of the base station 101, the transmitter 205 is configured to transmit, to the UE 104, the signal comprising positioning information for allowing a spatial position of the terminal device to be determined using the positioning information and the predetermined positioning scheme associated with the positioning information. The positioning information transmitted by the transmitter 205 is comprised within a system information block (SIB) of the transmitted signal, wherein the SIB is associated with a characteristic indicative to the UE 104 of the temporal validity of the transmitted positioning information. This allows the UE 104 to determine, at a time at which the received positioning information is temporally valid, the spatial position of the UE 104 using the received positioning information and the predetermined positioning scheme, as previously discussed.

Further details of some embodiments of the present technique are now discussed.

Embodiments of the present technique allow various types of positioning information to be received by the UE 104 in a manner which is both efficient in terms of network overhead (since the amount of data that needs to be transmitted using network resources in order to transmit up-to-date positioning information to the UE 104 is reduced) and UE power consumption (since new positioning information is only transmitted to the UE 104 when necessary, thus saving the power consumption associated with receiving positioning information). In particular, the embodiments of the present invention may be used for the transmission of positioning information used in an RTK (Real Time Kinematic) positioning scheme (as discussed in [3], [4] and [5], for example). It can be gathered from the teachings of [3], [4] and [5] that:

1. Positioning information may have a validity area (that is, geographical region over which it can be used by the UE 104 in determining the UE position to an acceptable degree of accuracy). The validity area may be different for positioning information associated with different positioning schemes.

2. Positioning information may have a validity time (that is, a time period over which it can be used by the UE 104 in determining the UE position to an acceptable degree of accuracy). Depending on the positioning information, the validity time may be different. It is noted that two instances of positioning information associated with the same positioning scheme may be associated with a different validity time, depending on the acceptable level of accuracy of the UE positioning information (the UE may need to determine its position to a level of accuracy which depends on the purpose of the positioning, for example).

In embodiments, the present technique allows the positioning information to be delivered via system information in such a way that the above-mentioned validity area and validity time of the positioning information is taken into account.

According to existing 3GPP agreements (e.g. as discussed in [3], [4] and [5]), the various types of positioning information relating to respective types of positioning schemes may be included in a single SIB. Such a SIB includes all necessary positioning information for each positioning scheme (e.g. OTDOA (Observed Time Difference Of Arrival), conventional RTK, Network RTK and the like). All the information shares the same value tag and is valid for the same predetermined validity time (e.g. 3 hours for LTE). Such an arrangement means that, even though different instances of positioning information may have different respective validity times and/or validity areas, in the case that one instance of positioning information needs to be updated, a UE must receive and decode a whole new SIB comprising all positioning information (even the positioning information which has not been updated). The transmission of this unnecessary information results in increased network overhead and increased UE power consumption.

The present technique recognises this, and provides an arrangement which focusses only on the positioning information which actually has to be updated, based on the validity time and validity area associated with each type of received positioning information.

In one embodiment, positioning information having the same validity area and validity time is comprised within a dedicated SIB. This alleviates the need to regularly updated all positioning information (regardless of validity area or validity time), thus reducing network overhead and UE power consumption (since the UE does not need to receive and decode all positioning information comprised within a SIB when only a certain type of positioning information is actually being used for positioning by the UE). In this case, a dedicated timer is allocated to each respective SIB according to the validity time of the positioning information (all having the same validity area) carried by that SIB.

More specifically, each instance of positioning information (each instance of positioning information being for determining a position of the UE 104 using a respective positioning scheme) with the same validity area is transmitted in one of a plurality of SIBs dedicated to the transmission of positioning information with that specific validity area. That is, there is a plurality of SIBs each associated with a specific validity area, and each of these SIBs carries positioning information with that specific validity area. The validity time of positioning information carried by that SIB is indicated by a characteristic of the SIB. For example, the characteristic may be an identifier of the SIB which distinguishes it from other SIBs such as a number indicative of the SIB type. For example, each SIB type may be labelled SIB-X, where X is a number with a different respective value for each different type of SIB. SIB-n may then carry positioning information with a first validity area and a first validity time, SIB-n+1 may then carry positioning information with the first validity area and a second validity time, SIB-n+2 may then carry positioning information with a second validity area and the first validity time (or even a third validity time) and SIB-n+3 may then carry positioning information with the second validity area and the second validity time (or even the third or a fourth validity time). In this case, n, n+1, n+2 and n+3 are examples of values which X may take. A UE 104 carrying out positioning using positioning information with the first validity area and which expires at the first validity time therefore knows that, once the first validity time expires, it only needs to receive SIB-n in order to receive updated positioning information. On the other hand, a UE 104 carrying out positioning using positioning information with the first validity area and which expires at the second validity time knows that, once the second validity time expires, it only needs to receive SIB-n+1 in order to receive updated positioning information. Similarly, a UE 104 carrying out positioning using positioning information with the second validity area and which expires at the first (or third) validity time therefore knows that, once the first (or third) validity time expires, it only needs to receive SIB-n+2 in order to receive updated positioning information. On the other hand, a UE 104 carrying out positioning using positioning information with the second validity area and which expires at the second (or third, or fourth) validity time knows that, once the second (or third, or fourth) validity time expires, it only needs to receive SIB-n+3 in order to receive updated positioning information. The validity time and validity area of each SIB may be known by the UE 104 in advance (e.g. data indicative of the validity time and validity area of each SIB may be stored in the storage medium 203). In an embodiment, each validity area is associated with a respective area ID which is know by the UE 104 in advance. The SIB(s) associated with each validity area are then associated with the area ID of that area. For example, the storage medium 203 of the UE 104 may store a lookup table relating each SIB type (as identified by the number SIB-X) with a respective area ID.

Figure 3:
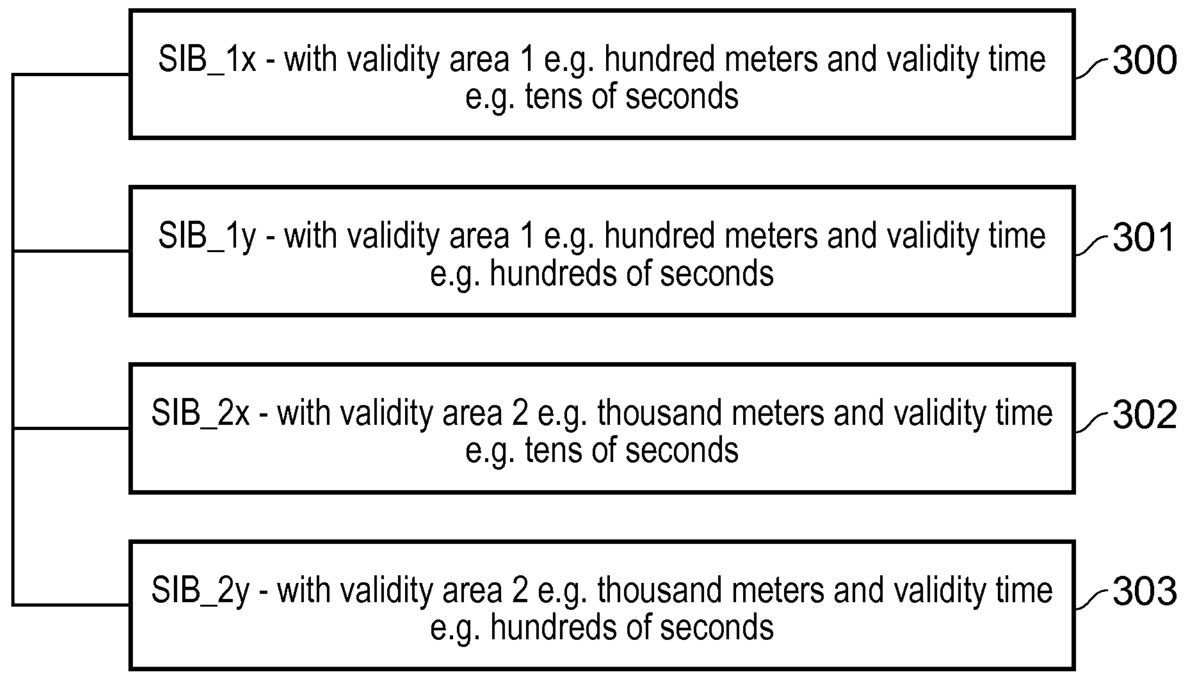
FIG. 3 schematically shows a plurality of system information blocks (SIBS), each associated with a respective validity area and validity time, according to an embodiment.

A more general example of this is shown in FIG. 3, in which a first SIB 300 (SIB_1*x*) has a validity area 1 (e.g. of the order of hundreds of metres) and a validity time 1 (e.g. of the order of tens of seconds), a second SIB 301 (SIB_1*y*) has a validity area 1 (e.g. of the order of hundreds of metres) and a validity time 2 (e.g. of the order of hundreds of seconds), a third SIB 302 (SIB_2*x*) has a validity area 2 (e.g. of the order of thousands of metres) and a validity time 1 (e.g. of the order of tens of seconds) and a fourth SIB 303 (SIB_2*y*) has a validity area 2 (e.g. of the order of thousands of metres) and a validity time 2 (e.g. of the order of hundreds of seconds).

With the present technique, the UE 104 thus only needs to receive a SIB comprising the subset of positioning information containing the positioning information currently used by the UE 104 and, furthermore, only needs to receive that SIB when the validity time of the positioning information currently used by the UE has expired. This results in a reduction in the amount of data which must be transmitted to the UE 104 compared to the above-mentioned conventional arrangement, in which a single SIB containing data indicative of all positioning information must be received and decoded by the UE 104 in order to update only a single type of positioning information.

It is noted that, with the above-mentioned embodiment, each SIB will contain one or more types of positioning information, wherein positioning information for use with a particular positioning scheme for determining the position of the UE 104 is defined as being positioning information of a particular type. Each type of positioning information may be present in more than one SIB. For example, positioning information of a certain type (e.g. RTK positioning information) may be present in a first SIB associated with a first validity area and a first validity time and a second SIB associated with the first validity area and a second validity time, the second validity time being longer than the first validity time. In this case, depending on the required level of positioning accuracy of the UE 104, the UE 104 may receive the positioning information in either the first SIB (if higher positioning accuracy is required, higher positioning accuracy requiring more up-to-date positioning information) or the second SIB (if lower positioning accuracy is required, lower positioning accuracy requiring less up-to-date positioning information). Similarly, positioning information of a certain type (e.g. RTK positioning information) may be present in a first SIB associated with a first validity area and a first validity time and a second SIB associated with a second validity area and the first validity time, the second validity area being larger than the first validity area. Again, depending on the required level of positioning accuracy of the UE 104, the UE 104 may receive the positioning information in either the first SIB (if higher positioning accuracy is required, higher positioning accuracy requiring more geographically granulated positioning information) or the second SIB (if lower positioning accuracy is required, lower positioning accuracy requiring less geographically granulated positioning information).

In another embodiment, a single SIB is used for carrying all types of positioning information associated with a particular geographical region. However, each type of positioning information carried by the SIB is associated with a respective time value for use by the UE 104 in determining the validity time of the positioning information of that type.

More specifically, the SIB may be a SIB of a predetermined type (e.g. a SIB type with a particular numerical identifier SIB-X, where X is a number which allows the SIB type to be distinguished from other SIB types having different respective numerical identifiers) and may comprise each of a plurality of types of positioning information. Each type of positioning information is associated with respective data of the SIB indicating a time for determining the temporal validity positioning information of that type.

Figure 4:
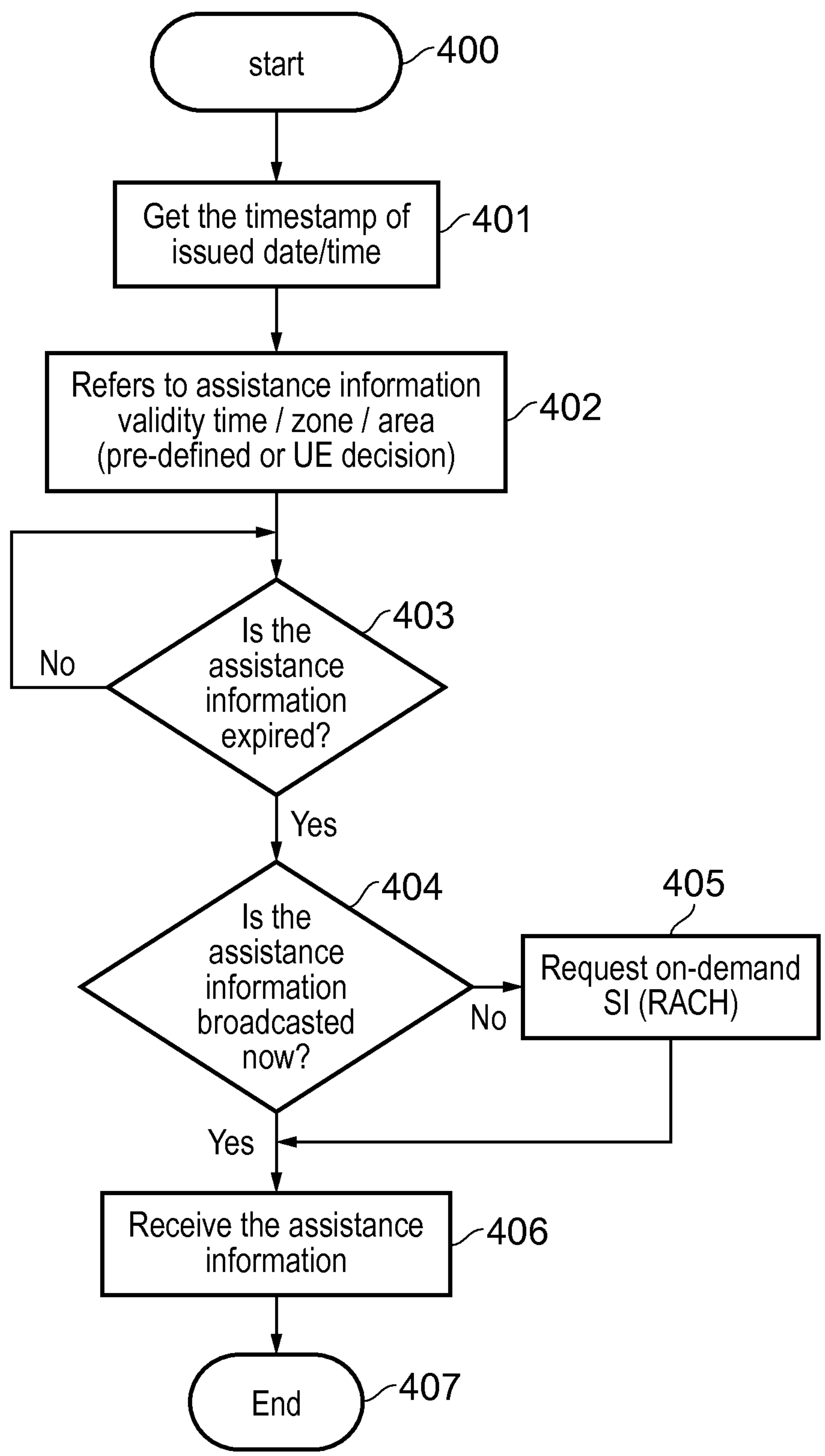
FIG. 4 schematically shows a process carried out by a terminal device for receiving positioning information via a SIB.

FIG. 4 schematically shows a process carried out by the UE 104 for receiving positioning information via such a SIB.

The process starts at step 400. At step 401, the UE 104 receives the SIB comprising each of the types of positioning information and the data indicative of the temporal validity of the positioning information of each type from the network. The temporal validity data comprises a date and/or time, for example. The temporal validity data comprised within the SIB is read by the UE 104 at step 402.

In one example, the temporal validity data comprises a time stamp indicating a date and/or time of transmission of the SIB (in this case, data indicative of the time stamp may be present only once in the SIB and applies to the positioning information of all types carried by the SIB. In this case, the validity time of the positioning information of each type may be computed by the controller 202 of the UE 104 adding a predetermined validity duration of the positioning information of each type to the date and/or time indicated by the time stamp. Such validity durations may be stored in advance in the storage medium 203 of the UE 104, for example, and may take the form of a duration (in a suitable time unit or combination of time units such as seconds, minutes, hours or days) specified for each type of positioning information. In this case, the calculated validity time of a particular type of positioning information is a date and/or time at which the validity of that positioning information expires. Validity durations may be specified in advance (or by suitable signals transmitted to the UE 104) by any suitable source, such as space agencies operating GNSS satellites used for the positioning scheme associated with a particular type of positioning information (see [6] or [7], for example).

In another example, the temporal validity data comprises an expiry date and/or time of each respective type of positioning information. In this case, the UE 104 is able to use this information directly in determining the temporal validity of the received positioning information of a particular type.

It is noted that, in this description, the term "date and/or time" may be referred to more generally simply as the "time", since both the date (e.g. 10 Nov. 2017) and time of day (e.g. 1:15 pm or 10:30 am) are measures of time.

At step 403, it is determined, based on the determined validity time (e.g. expiry time) whether the positioning information of the type currently in use by the UE 104 has expired. Positioning information is deemed to have expired when the current time exceeds the expiry time. If the current positioning information has not yet expired, then the process returns to step 403. On the other hand, if the current positioning information has expired, then the process proceeds to step 404.

At step 404, it is determined whether updated positioning information of the particular type which has expired is currently being broadcast (as part of the predetermined SIB) by the base station 101. If updated positioning information is being broadcast, then the process proceeds to step 406, in which the UE 104 receives the broadcast updated positioning information. On the other hand, if the updated positioning information is not currently being broadcast, then the process proceeds first to step 405, in which the UE 104 transmits a request for the updated positioning information to be transmitted by the base station 101. In response to this request, the base station 101 transmits the updated positioning information (using the predetermined SIB—in this case, the predetermined SIB is thus transmitted "on-demand"). The updated positioning information is then received by the UE 104 at step 406. The process then ends at step 407.

Thus, with this embodiment, it will be appreciated that the UE 104 must only receive the predetermined SIB comprising positioning information when the positioning information currently used by the UE 104 in determining its position has expired. Network overhead and UE power consumption is therefore reduced compared to the conventional arrangement in which a UE must receive and decode updated positioning information regardless of whether or not that updated positioning information is required. The reduction in network overhead and power consumption is especially relevant to UEs for which lower accuracy positioning is acceptable, since updated positioning information of the type used by the UE may be received at a significantly lower rate than would otherwise be possible.

In general, it will be appreciated that any SIB carrying updated positioning information (e.g. a SIB carrying only positioning information of types of a certain validity area and validity time or a SIB carrying all types of positioning information together with temporal validity data associated with each of those types) may be transmitted (e.g. broadcast or using dedicated signalling) by the base station 101 without the need for a request signal requesting transmission of the SIB being transmitted by the UE 104 (e.g. the base station 101 may periodically transmit the SIB) or, alternatively, in response to such a request signal being transmitted by the UE 104 (that is, the SIB is transmitted by the base station 101 in an on-demand manner).

In an embodiment, the UE 104 may be configured to continue using a particular type of positioning information even after the positioning information is no longer temporally valid (that is, after it has expired). In this case, the controller 202 may determine, based on one or more characteristics associated with the UE 104, whether it is acceptable for the position of the UE 104 to continue to be determined using the positioning information which is no longer temporally valid. Data indicative of the one or more characteristics which must be met in order for expired positioning information to continue to be used may be stored in advance in the storage medium 203 of the UE 104, for example. When it is determined that it is acceptable for the position of the UE 104 to continue to be determined using expired positioning information, the UE 104 may choose not to receive the updated positioning information until a later time and/or until the UE 104 moves to a geographical region for which different positioning information is required. An example of the characteristics which may be used to determine that expired positioning information may continue to be used by a UE 104 is discussed in US20150153458 A1, for example. It will be appreciated that a UE 104 may also choose not to receive updated positioning information if the UE 104 moves outside of a validity area of that positioning information using a similar arrangement to that described here for the use of temporally expired positioning information (in particular, a UE 104 may choose to not update positioning information when moving outside of a validity area specified for that positioning information if one or more predetermined characteristics associated with the UE 104 are met). In either case (that is, using temporally expired positioning information or positioning information relating to a validity area which the UE 104 has now left), the receipt of updated positioning information is delayed and thus made less frequent. Network overhead (in particular in the case of updated positioning information being received via an on-demand SIB) and UE power consumption are therefore further reduced. The above-described arrangements are particularly relevant to UEs for which it is acceptable to have less accurate positioning (e.g. 50 cm accuracy reduced to 2 m accuracy) in order to obtain lower power consumption.

In one example, if the UE 104 has an advanced GNSS receiver such as a dual band GPS receiver (e.g. L1 and L5), some assistance information is no longer important. For example, if an ionospheric model used for GPS is changed in response to a variation in the ionosphere, a dual band GPS receiver should be resilient to the change compared to a single band GPS receiver (e.g. L1 C/A only). A UE 104 with a dual band GPS receiver therefore does need to receive updated positioning information in the form of GNSS assistance information (generated based on the updated ionospheric model). In this case, the characteristic of the UE 104 which enables the UE 104 to not receive updated positioning information outside of the validity area and/or after expiry of the validity time comprises the two conditions (a) the updated positioning information updated GNSS assistance information relating to the changed ionospheric model and (b) the UE 104 has a dual band GPS receiver. Both (a) and (b) (stored in the storage medium 203) must be satisfied in order for the UE 104 to delay the positioning information update.

As previously mentioned, each instance of positioning information may be associated with a validity area. The validity area of a particular instance of positioning information is a geographical region over which the positioning information is valid (that is, a geographical area over which use of that positioning information by a UE 104 in determining its position is deemed sufficiently accurate). Each base station 101 of the network 100 is also associated with a coverage area (or cell) within which signals may be transmitted between that base station 101 and a UE. The validity area of positioning information transmitted by the network may be larger than the coverage area of a base station 101 transmitting that positioning information. In particular, the validity area of certain positioning information may include the coverage areas of a plurality of base stations (e.g. neighbouring base stations). In this case, each of the plurality of base stations will transmit the same positioning information over a time period for which that positioning information is valid. Thus, when a UE 104 moves from the coverage area of one base station to another base station, it may not be necessary for the UE 104 to receive updated positioning information during the cell reselection process.

Thus, in an embodiment of the present technique, a UE 104 is able to determine, based on information transmitted by each base station 101 (e.g. in the—minimum system information transmitted by each base station 101), the validity area of the positioning information currently used by the UE 104. The information transmitted by each base station 101 may be an area identifier (area ID) indicating the relevant validity area, for example. When the UE moves from the coverage area of a first base station to the coverage area of a second base station, the UE (in particular, the control circuitry 202) determines, based on the area ID transmitted by the first base station and the area ID transmitted by the second base station, whether the validity area of the positioning information currently used by the UE has changed. If the validity area has not changed, then the UE continues to perform positioning based on the positioning information previously received from the first base station. On the other hand, if the validity area has changed, then the UE receives new positioning information from the second base station. The UE 104 thus only needs to obtain new positioning information in the case that the validity area for the positioning information currently used by the UE 104 has changed, thus reducing network overhead and UE power consumption. It is noted that different instances of positioning information may be associated with different validity areas. Each instance of positioning information may be a different respective type of positioning information (based on the positioning scheme which uses that positioning information), for example.

A different area ID may be associated with each SIB used for transmission of the positioning information. In the case that one of a plurality of receivable SIBs is received by the UE 104 in order for the UE 104 to receive the positioning information (in the case that one or more types of positioning information for each validity area and validity time are transmitted in a respective SIB, as explained with reference to FIG. 3, for example), each of the SIBs may be associated with a respective area ID indicative of the validity area of that SIB. In this case, when moving from one cell to another, a UE 104 searches for the area ID associated with the SIB within which the positioning information currently used by the UE 104 is found. Similarly, in the case that a single SIB comprising positioning information of all types, together with information indicative of the temporal validity of the positioning information of each type, is received by the UE 104 in order for the UE 104 to receive the positioning information (as explained with reference to FIG. 4, for example), a single area ID may be associated with that single SIB. In this case, when moving from one cell to another, a UE 104 searches for the area ID associated with this single SIB.

It will be appreciated that the validity area indicated by a particular area ID may be different to the coverage area(s) of one or more base stations 101 which transmit that particular area ID. In particular, positioning information may still be valid in an out-of-coverage (OOC) area (in which case, the validity area extends beyond the coverage area(s) of the one or more base stations transmitting the area ID associated with that validity). As previously explained, the size of the validity area usually depends on the accuracy of positioning. If higher accuracy is not required, then the validity area may be larger in order to reduce network overhead and UE power consumption.

It will be appreciated that the validity area may be indicated by reusing an existing identifier or equivalent as the area ID. For example, Mobile Country Code (MCC) (in particular, for the case of country specific positioning information, such as QZSS in Japan), Mobile Network Code (MNC) or any core network level area identifiers (e.g. tracking area) may be used as the area ID. If an existing identifier or equivalent is used as the area ID, then the network does not need to send a dedicated area ID for each SIB comprising positioning information in the minimum system information. In this case, the validity areas are known by the UE 104 in advance since they are indicated by a SIM (subscriber identity module) card (not shown) or equivalent (e.g. software-based SIM known as an e-SIM) configured for use with the UE 104, for example.

Each base station 101 may receive the positioning information and any additional associated information (e.g. validity area and/or validity time information) to be transmitted to UEs from another data processing apparatus such as a location server comprised within the network 100. In this case, in order to reduce the processing burden and network overhead at this other data processing apparatus, a first base station (anchor base station) which is to transmit the same positioning information as a second base station may first receive the positioning information (and any additional associated information) from the other data processing apparatus and then transmit that positioning information to the second base station. The positioning information may therefore be shared between base stations, and the other data processing apparatus does not have to individually transmit the same positioning information to all base stations which require it.

Each base station 101 of the network 100 may receive positioning information from the other data processing apparatus or another base station 101 or may transmit positioning information to another base station 101 using communication interface 207.

In one example (shown in FIG. 5), each base station 101A, 101B and 101C is a NR gNodeB and the communication interface 207 of each of the base stations is an X2/Xn interface. In this case, the gNBs neighbour each other and are configured transmit the same positioning information to a UE 104. Thus, instead of a location server 500 determining and transmitting the positioning information individually for each gNB, the gNBs share the positioning information and over the X2/Xn interface. In particular:

The location server 500 generates the positioning information

The location server may define the distribution area (based on the validity area of the positioning information) and thus relevant gNodeBs to which the positioning information is to be transmitted The location server transmits the positioning information 501 to anchor gNodeB 101C Anchor gNodeB 101C distributes the positioning information 501 to gNodeB #1 101A and gNodeB #2

Figure 5:
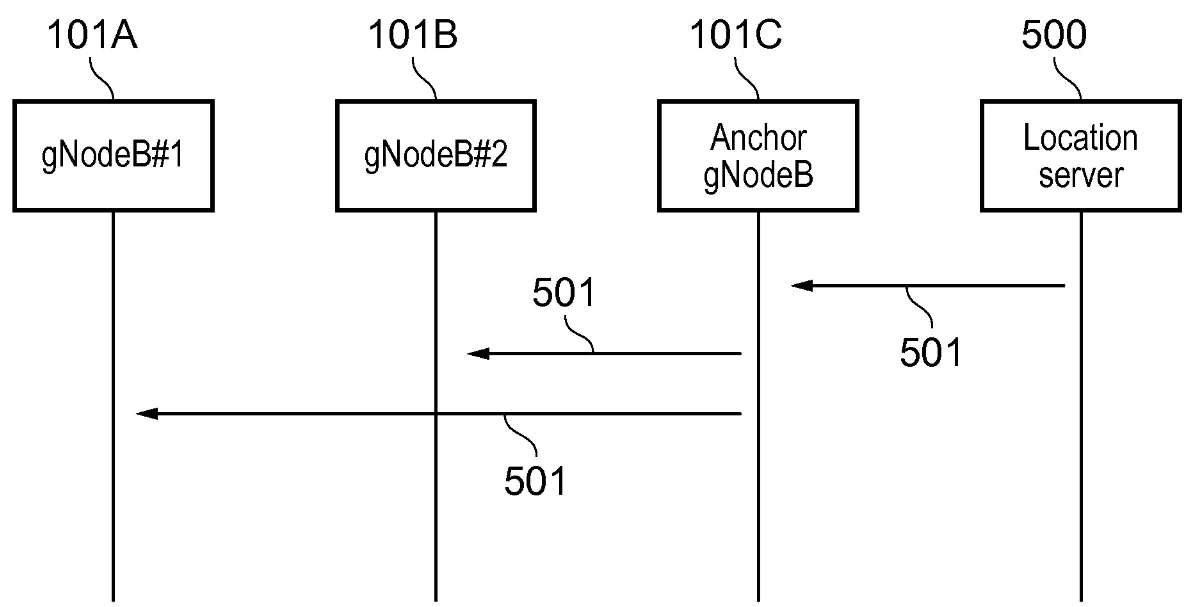
FIG. 5 schematically shows a transmission of positioning information between base stations of a wireless telecommunications network, according to an embodiment.

It will be appreciated that there may be a larger number of gNodeBs than that shown in FIG. 5. In addition, it will also be appreciated that a gNodeB (such as gNodeB #1 101A or gNodeB #2 101B) which receives the positioning information from an anchor gNodeB may also, in turn, act as an anchor gNodeB in order to further distribute the positioning information to neighbouring cells.

It will also be appreciated that, although in the example of FIG. 5, the same positioning information 501 is transmitted is transmitted from the anchor gNodeB 101C to each of other gNodeBs 101A and 101B, it may be the case that the anchor gNodeB transmits other respective positioning information to each of the gNodeBs 101A and 101B. In this case, the other respective positioning information may be based on the positioning information 501 received from the location server 500, but may be adjusted depending on one or more characteristics of the gNodeBs 101A and 101B. For example, if one of the gNodeBs 101A and 101B is associated with a different validity area for the positioning information compared to that of the gNodeB 101C, then the gNodeB 101C (in particular, the controller 206 of the gNodeB 101C) may adjust the positioning information (e.g. adjust the values of the positioning information, based on a predetermined mathematical formula, lookup table or the like) such that it is valid for the different validity area of the gNodeB 101A or 101B. It will be appreciated that other characteristics resulting in different appropriate positioning information for different gNodeBs may also be taken into account by an anchor gNodeB in adjusting the positioning information prior to it being transmitted on to another gNodeB.

Figure 6:
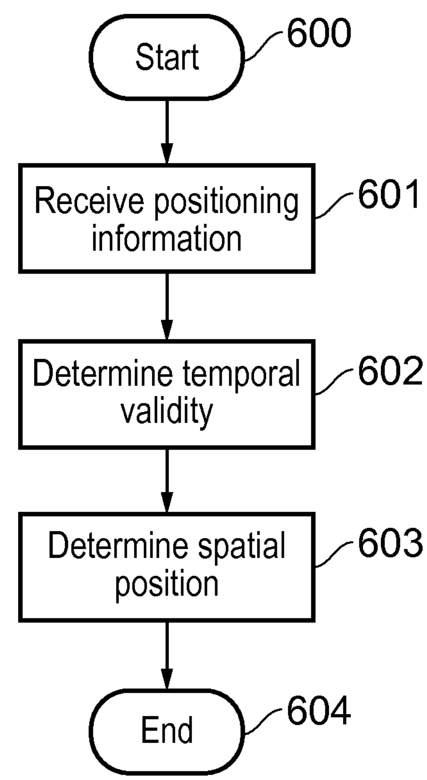
FIG. 6 schematically shows a method of operating a terminal device, according to an embodiment.

FIG. 6 schematically shows a method of operating the UE 104, according to an embodiment. The method starts at step 600. At step 601, the controller 202 controls the receiver 200 to receive, from the base station 101, a signal comprising positioning information for allowing a spatial position of the UE 104 to be determined using the positioning information and a predetermined positioning scheme associated with the positioning information, the positioning scheme comprising one or more of instructions and additional information for determining the position of the UE 104 using the positioning information, wherein the positioning information is comprised within a system information block (SIB) of the received signal. At step 602, based on a characteristic of the SIB, a temporal validity of the received positioning information is determined by the controller 202. At step 603, at a time at which the received positioning information is temporally valid, the spatial position of the UE 104 is determined using the received positioning information and the predetermined positioning scheme. The process then ends at step 604.

Figure 7:
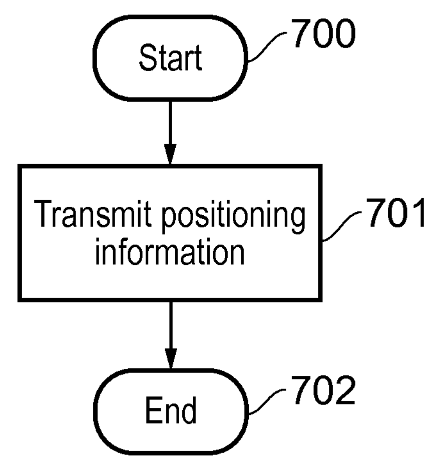
FIG. 7 schematically shows a method of operating a base station, according to an embodiment.

FIG. 7 schematically shows a method of operating the base station 101, according to an embodiment. The method starts at step 700. At step 701, the controller 206 controls the transmitter 205 to transmit, to the UE 104, a signal comprising positioning information for allowing a spatial position of the UE 104 to be determined using the positioning information and a predetermined positioning scheme associated with the positioning information, the positioning scheme comprising one or more of instructions and additional information for determining the position of the UE 104 using the positioning information. The positioning information is comprised within a system information block (SIB) of the transmitted signal, and the SIB is associated with a characteristic indicative to the UE 104 of a temporal validity of the received positioning information so as to allow the UE 104 to determine, at a time at which the received positioning information is temporally valid, the spatial position of the UE 104 using the received positioning information and the predetermined positioning scheme.

It will be appreciated that, in the embodiment in which multiple SIBs each comprise one or more types of positioning information sharing the same area validity and time validity, it may be the case that each of the multiple SIBs comprises one or more types of positioning information sharing the same area validity (but not necessarily the same time validity) or the same time validity (but not necessarily the same area validity). In the case of the former (that is, same area validity but not necessarily the same time validity), a time validity for each type of positioning information may be known in advance (e.g. pre-stored as data in the storage medium 203 of the UE 104). In the case of the latter (that is, same time validity but not necessarily the same area validity), an area validity for each type of positioning information may be known in advance (e.g. pre-stored as data in the storage medium 203 of the UE 104). In such examples, the UE 104 need only choose the SIB with the positioning information of the correct area validity or time validity (but not both).

In the case that each of the multiple SIBs comprises one or more types of positioning information sharing the same area validity only (that is, sharing the same geographical region over which each of the one or more types of positioning information is valid), the process carried out at the UE 104 is the same as that described with reference to FIG. 6, with the following exceptions. Firstly, at step 602, a geographical region over which the received positioning information is valid (rather than a temporal validity) is determined by the controller 202 based on a characteristic of the SIB (e.g. SIB type number—SIB-X). Secondly, at step 603, the spatial position of the UE 104 is determined using the received positioning information and the predetermined positioning scheme only when the UE 104 is located within the geographical region over which the received positioning information is valid.

Similarly, in the case that each of the multiple SIBs comprises one or more types of positioning information sharing the same area validity only (that is, sharing the same geographical region over which each of the one or more types of positioning information is valid), the process carried out at the base station 101 is the same as that described with reference to FIG. 7, with the exception that, at step 701, the SIB comprising the positioning information is associated with a characteristic indicative to the UE 104 of a geographical region over which the received positioning information is valid so as to allow the UE 104 to determine, when the UE 104 is located within the geographical region over which the received positioning information is valid, the spatial position of the UE 104 using the received positioning information and the predetermined positioning scheme.

Some embodiments of the present technique are defined by the following numbered clauses:

Clause 1. A terminal device for use with a wireless telecommunications network, the terminal device comprising:

receiver circuitry configured to receive, from infrastructure equipment of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the received signal; and processing circuitry configured:

to determine, based on a characteristic of the SIB, a temporal validity of the received positioning information, and to determine, at a time at which the received positioning information is temporally valid, the spatial position of the terminal device using the received positioning information and the predetermined positioning scheme.

Clause 2. A terminal device according to clause 1, wherein:

the positioning information is one of a plurality of types of positioning information, each type of positioning information being for determining a spatial position of the terminal device using a respective positioning scheme, the positioning scheme of each type of positioning information comprising one or more of instructions and additional information for determining the position of the terminal device using that type of positioning information, and each type of positioning information being associated with a respective temporal validity;

the SIB of the received signal is one of a plurality of SIBs receivable by the receiver circuitry, each of the plurality of receivable SIBs comprising one or more of the plurality of types of positioning information each of which are associated with the same temporal validity; and the characteristic of the SIB of the received signal is an identifier which distinguishes the SIB of the received signal from each of the other receivable SIBs.

Clause 3. A terminal device according to clause 2, wherein:

each type of positioning information is associated with a respective geographical region over which the positioning information of that type is valid;

each of the plurality of receivable SIBs comprises one or more of the plurality of types of positioning information each of which are associated with the same geographical region.

Clause 4. A terminal device according to clause 2 or 3, wherein the identifier which distinguishes the SIB of the received signal from each of the other receivable SIBs is a number indicative of a type of the SIB of the received signal.

Clause 5. A terminal device according to clause 1, wherein:

the SIB of the received signal comprises each of a plurality of types of positioning information, each type of positioning information being for determining a spatial position of the terminal device using a respective positioning scheme, the positioning scheme of each type of positioning information comprising one or more of instructions and additional information for determining the position of the terminal device using that type of positioning information, and each type of positioning information being associated with respective data of the SIB indicating a time for determining the temporal validity positioning information of that type; and the characteristic of the SIB of the received signal is the data indicating a time for determining the temporal validity of the positioning information of the type to be used with the predetermined positioning scheme in determining the spatial position of the terminal device.

Clause 6. A terminal device according to clause 5, wherein:

the time for determining the temporal validity of the positioning information of the type to be used with the predetermined positioning scheme in determining the spatial position of the terminal device is a time stamp indicating a time of transmission of the SIB of the received signal; and the processing circuitry is configured to determine the temporal validity of the positioning information of the type to be used with the predetermined positioning scheme in determining the spatial position of the terminal device based on the time stamp and data indicative of a valid duration of the positioning information of the type to be used with the predetermined positioning scheme in determining the spatial position of the terminal device.

Clause 7. A terminal device according to clause 5, wherein the time for determining the temporal validity of the positioning information of the type to be used with the predetermined positioning scheme in determining the spatial position of the terminal device is an expiry time of the validity of the positioning information of the type to be used with the predetermined positioning scheme in determining the spatial position of the terminal device.

Clause 8. A terminal device according to any preceding clause, wherein:

the terminal device comprises a storage medium storing data indicative of a first geographical region over which the type of positioning information to be used with the predetermined positioning scheme in determining the spatial position of the terminal device as received from the infrastructure equipment is valid; and when the terminal device moves from a coverage area of the infrastructure equipment to another coverage area of other infrastructure equipment of the wireless telecommunications network:

the receiver circuitry is configured to receive, from the other infrastructure equipment, a signal indicative of a second geographical region over which the type of positioning information to be used with the predetermined positioning scheme in determining the spatial position of the terminal device as received from the other infrastructure equipment is valid; and the processing circuitry is configured:

to determine whether the first geographical region is different to the second geographical region;

when the first geographical region is different to the second geographical region, to control the receiver circuitry to receive, from the other infrastructure equipment, a signal comprising further positioning information for allowing the spatial position of the terminal device to be determined using the further positioning information and the predetermined positioning scheme.

Clause 9. A terminal device according to clause 8, wherein the infrastructure equipment is configured:

to receive, from a data processing apparatus of the network, the positioning information; and to transmit, to the other infrastructure equipment, further positioning information, the further positioning information being based on the received positioning information.

Clause 10. A terminal device according to any preceding clause, wherein the geographical region over which the type of positioning information to be used with the predetermined positioning scheme in determining the spatial position of the terminal device as received from the infrastructure equipment is valid is different to a coverage area of the infrastructure equipment.

Clause 11. A terminal device according to any preceding clause, wherein, when the received positioning information is no longer temporally valid, the processing circuitry is configured to control the receiver circuitry to receive, from infrastructure equipment of the wireless telecommunications network, a signal comprising further positioning information for allowing a spatial position of the terminal device to be determined using the further positioning information and the predetermined positioning scheme.

Clause 12. A terminal device according to clause 11, wherein the processing circuitry is configured:

to determine, using a predetermined characteristic associated with the terminal device, whether it is acceptable for the spatial position of the terminal device to continue to be determined using the positioning information which is no longer temporally valid;

when it is determined that it is acceptable for the spatial position of the terminal device to continue to be determined using the positioning information which is no longer temporally valid, to control the receiver circuitry to receive the signal comprising the further positioning information from infrastructure equipment of the wireless telecommunications network only after a delay period.

Clause 13. A terminal device according to any preceding clause, wherein the SIB comprising the positioning information is broadcasted by the infrastructure equipment.

Clause 14. A terminal device according to any preceding clause, wherein:

the terminal device comprises transmitter circuitry; and the SIB comprising the positioning information is transmitted by the infrastructure equipment in response to the transmitter circuitry transmitting a signal to the infrastructure equipment requesting the SIB comprising the positioning information.

Clause 15. Infrastructure equipment for use with a wireless telecommunications network, the infrastructure equipment comprising transmitter circuitry configured to transmit, to a terminal device of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the transmitted signal, wherein the SIB is associated with a characteristic indicative to the terminal device of a temporal validity of the transmitted positioning information so as to allow the terminal device to determine, at a time at which the received positioning information is temporally valid, the spatial position of the terminal device using the received positioning information and the predetermined positioning scheme.

Clause 16. Infrastructure equipment according to clause 15, wherein:

the positioning information is one of a plurality of types of positioning information, each type of positioning information being for determining a spatial position of the terminal device using a respective positioning scheme, the positioning scheme of each type of positioning information comprising one or more of instructions and additional information for determining the position of the terminal device using that type of positioning information, and each type of positioning information being associated with a respective temporal validity;

the SIB of the transmitted signal is one of a plurality of transmittable SIBs receivable by the terminal device, each of the plurality of transmittable SIBs comprising one or more of the plurality of types of positioning information each of which are associated with the same temporal validity; and the characteristic of the SIB of the transmitted signal is an identifier which distinguishes the SIB of the transmitted signal from each of the other transmittable SIBs.

Clause 17. Infrastructure equipment according to clause 16, wherein:

each type of positioning information is associated with a respective geographical region over which the positioning information of that type is valid;

each of the plurality of receivable SIBs comprises one or more of the plurality of types of positioning information each of which are associated with the same geographical region.

Clause 18. Infrastructure equipment according to clause 16 or 17, wherein the identifier which distinguishes the SIB of the transmitted signal from each of the other transmittable SIBs is a number indicative of a type of the SIB of the transmitted signal.

Clause 19. Infrastructure equipment according to clause 15, wherein:

the SIB of the transmitted signal comprises each of a plurality of types of positioning information, each type of positioning information being for use by the terminal device in determining a spatial position of the terminal device using a respective positioning scheme, the positioning scheme of each type of positioning information comprising one or more of instructions and additional information for determining the position of the terminal device using that type of positioning information, and each type of positioning information being associated with respective data of the SIB indicating a time for determining the temporal validity positioning information of that type; and the characteristic of the SIB of the transmitted signal is the data indicating a time for determining the temporal validity of the positioning information of the type to be used by the terminal device with the predetermined positioning scheme in determining the spatial position of the terminal device.

Clause 20. Infrastructure equipment according to clause 19, wherein:

the time for determining the temporal validity of the positioning information of the type to be used by the terminal device with the predetermined positioning scheme in determining the spatial position of the terminal device is a time stamp indicating a time of transmission of the SIB of the transmission signal so as to enable the terminal device to determine the temporal validity of the positioning information of the type to be used by the terminal device with the predetermined positioning scheme in determining the spatial position of the terminal device based on the time stamp and data indicative of a valid duration of the positioning information of the type to be used by the terminal device with the predetermined positioning scheme in determining the spatial position of the terminal device.

Clause 21. Infrastructure equipment according to clause 19, wherein the time for determining the temporal validity of the positioning information of the type to be used by the terminal device with the predetermined positioning scheme in determining the spatial position of the terminal device is an expiry time of the validity of the positioning information of the type to be used by the terminal device with the predetermined positioning scheme in determining the spatial position of the terminal device.

Clause 22. Infrastructure equipment according to any one of clauses 15 to 21, wherein transmitter circuitry is configured to transmit, to the terminal device, a signal indicative of a geographical region over which the type of positioning information to be used by the terminal device with the predetermined positioning scheme in determining the spatial position of the terminal device as transmitted by the transmitter circuitry is valid.

Clause 23. Infrastructure equipment according to clause 22, wherein:

the infrastructure equipment comprises communication circuitry configured to transmit or receive data from other infrastructure equipment of the wireless telecommunications network; and the communication circuitry is configured:

to receive, from a data processing apparatus of the network, the positioning information and to transmit, to the other infrastructure equipment, further positioning information, the further positioning information being based on the received positioning information; or to receive the positioning information from the other infrastructure equipment, the positioning information being based on further positioning information received by the other infrastructure equipment from a data processing apparatus of the network.

Clause 24. Infrastructure equipment according to any one of clauses 15 to 23, wherein the geographical region over which the type of positioning information to be used by the terminal device with the predetermined positioning scheme in determining the spatial position of the terminal device as transmitted by the infrastructure equipment is valid is different to a coverage area of the infrastructure equipment.

Clause 25. Infrastructure equipment according to any one of clauses 15 to 24, wherein, when the transmitted positioning information is no longer temporally valid, the transmitter circuitry is configured to transmit, to the terminal device, a signal comprising further positioning information for allowing a spatial position of the terminal device to be determined by the terminal device using the further positioning information and the predetermined positioning scheme.

Clause 26. Infrastructure equipment according to any one of clauses 15 to 25, wherein the SIB comprising the positioning information is broadcasted by the transmitter circuitry.

Clause 27. Infrastructure equipment according to any one of clauses 15 to 23, wherein:

the infrastructure equipment comprises receiver circuitry; and the SIB comprising the positioning information is transmitted by the transmitter circuitry in response to the receiver circuitry receiving a signal from the terminal device requesting the SIB comprising the positioning information.

Clause 28. A wireless telecommunications system comprising a terminal device according to clause 1 and infrastructure equipment according to clause 15.

Clause 29. A terminal device for use with a wireless telecommunications network, the terminal device comprising:

receiver circuitry configured to receive, from infrastructure equipment of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the received signal; and processing circuitry configured:

to determine, based on a characteristic of the SIB, a geographical region over which the received positioning information is valid, and to determine, when the terminal devices is located within the geographical region over which the received positioning information is valid, the spatial position of the terminal device using the received positioning information and the predetermined positioning scheme.

Clause 30. A terminal device according to clause 29, wherein:

the positioning information is one of a plurality of types of positioning information, each type of positioning information being for determining a spatial position of the terminal device using a respective positioning scheme, the positioning scheme of each type of positioning information comprising one or more of instructions and additional information for determining the position of the terminal device using that type of positioning information, and each type of positioning information being associated with a respective geographical region over which positioning information of that type is valid;

the SIB of the received signal is one of a plurality of SIBs receivable by the receiver circuitry, each of the plurality of receivable SIBs comprising one or more of the plurality of types of positioning information each of which are associated with the same geographical region; and the characteristic of the SIB of the received signal is an identifier which distinguishes the SIB of the received signal from each of the other receivable SIBs.

Clause 31. Infrastructure equipment for use with a wireless telecommunications network, the infrastructure equipment comprising transmitter circuitry configured to transmit, to a terminal device of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the transmitted signal, wherein the SIB is associated with a characteristic indicative to the terminal device of a geographical region over which the transmitted positioning information is valid so as to allow the terminal device to determine, when located within the geographical region over which the received positioning information is valid, the spatial position of the terminal device using the received positioning information and the predetermined positioning scheme.

Clause 32. Infrastructure equipment according to clause 31, wherein:

the positioning information is one of a plurality of types of positioning information, each type of positioning information being for determining a spatial position of the terminal device using a respective positioning scheme, the positioning scheme of each type of positioning information comprising one or more of instructions and additional information for determining the position of the terminal device using that type of positioning information, and each type of positioning information being associated with a respective geographical region over which the positioning information of that type is valid;

the SIB of the transmitted signal is one of a plurality of transmittable SIBs receivable by the terminal device, each of the plurality of transmittable SIBs comprising one or more of the plurality of types of positioning information each of which are associated with the same geographical region; and the characteristic of the SIB of the transmitted signal is an identifier which distinguishes the SIB of the transmitted signal from each of the other transmittable SIBs.

Clause 33. A wireless telecommunications system comprising a terminal device according to clause 29 and infrastructure equipment according to clause 31.

Clause 34. A method of operating a terminal device for use with a wireless telecommunications network, the terminal device comprising receiver circuitry, wherein the method comprises:

controlling the receiver circuitry to receive, from infrastructure equipment of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the received signal;

determining, based on a characteristic of the SIB, a temporal validity of the received positioning information; and determining, at a time at which the received positioning information is temporally valid, the spatial position of the terminal device using the received positioning information and the predetermined positioning scheme.

Clause 35. A method of operating Infrastructure equipment for use with a wireless telecommunications network, the infrastructure equipment comprising transmitter circuitry, wherein the method comprises controlling the transmitter circuitry to transmit, to a terminal device of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the transmitted signal, wherein the SIB is associated with a characteristic indicative to the terminal device of a temporal validity of the received positioning information so as to allow the terminal device to determine, at a time at which the received positioning information is temporally valid, the spatial position of the terminal device using the received positioning information and the predetermined positioning scheme.

Clause 36. A method of operating a terminal device for use with a wireless telecommunications network, the terminal device comprising receiver circuitry, wherein the method comprises:

controlling the receiver circuitry configured to receive, from infrastructure equipment of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the received signal; and determining, based on a characteristic of the SIB, a geographical region over which the received positioning information is valid, and determining, when the terminal devices is located within the geographical region over which the received positioning information is valid, the spatial position of the terminal device using the received positioning information and the predetermined positioning scheme.

Clause 37. A method of operating infrastructure equipment for use with a wireless telecommunications network, the infrastructure equipment comprising transmitter circuitry, wherein the method comprises:

controlling the transmit circuitry to transmit, to a terminal device of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the transmitted signal, wherein the SIB is associated with a characteristic indicative to the terminal device of a geographical region over which the transmitted positioning information is valid so as to allow the terminal device to determine, when located within the geographical region over which the received positioning information is valid, the spatial position of the terminal device using the received positioning information and the predetermined positioning scheme.

Clause 38. Circuitry for a terminal device for use with a wireless telecommunications network, the circuitry comprising:

receiver circuitry configured to receive, from infrastructure equipment of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the received signal; and processing circuitry configured:

to determine, based on a characteristic of the SIB, a temporal validity of the received positioning information, and to determine, at a time at which the received positioning information is temporally valid, the spatial position of the terminal device using the received positioning information and the predetermined positioning scheme.

Clause 39. Circuitry for infrastructure equipment for use with a wireless telecommunications network, the circuitry comprising transmitter circuitry configured to transmit, to a terminal device of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the transmitted signal, wherein the SIB is associated with a characteristic indicative to the terminal device of a temporal validity of the transmitted positioning information so as to allow the terminal device to determine, at a time at which the received positioning information is temporally valid, the spatial position of the terminal device using the received positioning information and the predetermined positioning scheme.

Clause 40. Circuitry for a terminal device for use with a wireless telecommunications network, the circuitry comprising:

receiver circuitry configured to receive, from infrastructure equipment of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the received signal; and processing circuitry configured:

to determine, based on a characteristic of the SIB, a geographical region over which the received positioning information is valid, and to determine, when the terminal devices is located within the geographical region over which the received positioning information is valid, the spatial position of the terminal device using the received positioning information and the predetermined positioning scheme.

Clause 41. Circuitry for infrastructure equipment for use with a wireless telecommunications network, the circuitry comprising transmitter circuitry configured to transmit, to a terminal device of the wireless telecommunications network, a signal comprising positioning information for allowing a spatial position of the terminal device to be determined using the positioning information and a predetermined positioning scheme associated with the positioning information, the positioning scheme comprising one or more of instructions and additional information for determining the position of the terminal device using the positioning information, wherein the positioning information is comprised within a system information block (SIB) of the transmitted signal, wherein the SIB is associated with a characteristic indicative to the terminal device of a geographical region over which the transmitted positioning information is valid so as to allow the terminal device to determine, when located within the geographical region over which the received positioning information is valid, the spatial position of the terminal device using the received positioning information and the predetermined positioning scheme.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] http://www.3gpp.org/DynaReport/36-series.htm

[2] http://www.3gpp.org/DynaReport/38-series.htm

[3] R2-1705308 Discussion on support for RTK corrections for high precisions GNSS positioning. 3GPP RAN2 #98.

[4] R2-1711154 The positioning assistance data broadcasting. 3GPP RAN2 #99bis

[5] R2-1708646 Discussion on state space RTK corrections. 3GPP RAN2 #99

[6] R2-1710536 GNSS positioning enhancement: ways forward to support SSR concept in Release 15. 3GPP RAN2 #99bis

[7] R2-1710537 GNSS positioning enhancements: detailed description of SSR messages for multi GNSS PPP. 3GPP RAN2 #99bis

The invention claimed is:

1. A terminal device for use with a wireless telecommunications network, the terminal device comprising:

receiver circuitry configured to receive, from infrastructure equipment of the wireless telecommunications network, a signal comprising positioning assistance information for allowing a spatial position of the terminal device to be determined using the positioning assistance information and a predetermined positioning scheme associated with the positioning assistance information, the positioning scheme comprising one or more of instructions and additional information for determining the position of the terminal device using the positioning assistance information, wherein the positioning assistance information is comprised within a system information block (SIB) of the received signal; and processing circuitry configured:

to determine a characteristic of the SIB and a temporal validity of the received positioning assistance information, and to determine, at a time at which the received positioning assistance information is temporally valid, the spatial position of the terminal device using the received positioning assistance information and the predetermined positioning scheme, wherein the positioning assistance information is one of a plurality of different types of positioning assistance information, wherein each said type of positioning assistance information is associated with a respective temporal validity, and wherein the characteristic of the SIB of the received signal is the type of positioning assistance information, and the type of the positioning assistance information is associated with a time corresponding to the respective temporal validity for determining the temporal validity of the positioning assistance information of the type to be used with the predetermined positioning scheme in determining the spatial position of the terminal device.

2. A terminal device according to claim 1, wherein:

each said type of positioning assistance information being for determining the spatial position of the terminal device using a respective positioning scheme, the positioning scheme of each type of positioning assistance information comprising one or more of instructions and additional information for determining the position of the terminal device using that type of positioning assistance information;

the SIB of the received signal is one of a plurality of SIBs receivable by the receiver circuitry, each of the plurality of receivable SIBs comprising one or more of the plurality of types of positioning assistance information each of which are associated with the same temporal validity; and the characteristic of the SIB of the received signal includes an identifier which distinguishes the SIB of the received signal from each of the other receivable SIBs.

3. A terminal device according to claim 2, wherein:

the positioning assistance information is associated with a respective geographical region over which the positioning assistance information is valid; and each of the plurality of receivable SIBs comprises one or more of the plurality of types of positioning assistance information plurality of which are associated with the same geographical region.

4. A terminal device according to claim 2, wherein the identifier which distinguishes the SIB of the received signal from each of the other receivable SIBs is a number indicative of a type of the SIB of the received signal.

5. A terminal device according to claim 1, wherein:

the SIB of the received signal comprises each of a plurality of types of positioning assistance information, each said type of positioning assistance information being for determining a spatial position of the terminal device using a respective positioning scheme, the positioning scheme of each type of positioning assistance information comprising one or more of instructions and additional information for determining the position of the terminal device using that type of positioning assistance information, and each type of positioning assistance information being associated with respective data of the SIB indicating the time for determining the temporal validity positioning assistance information of that type.

6. A terminal device according to claim 5, wherein:

the time for determining the temporal validity of the positioning assistance information of the type to be used with the predetermined positioning scheme in determining the spatial position of the terminal device is a time stamp indicating a transmission time of transmission of the SIB of the received signal; and the processing circuitry is configured to determine the temporal validity of the positioning assistance information of the type to be used with the predetermined positioning scheme in determining the spatial position of the terminal device based on the time stamp and data indicative of a valid duration of the positioning assistance information of the type to be used with the predetermined positioning scheme in determining the spatial position of the terminal device.

7. A terminal device according to claim 5, wherein the time for determining the temporal validity of the positioning assistance information of the type to be used with the predetermined positioning scheme in determining the spatial position of the terminal device is the time in the form of an expiry time of the validity of the positioning assistance information of the type to be used with the predetermined positioning scheme in determining the spatial position of the terminal device.

8. A terminal device according to claim 1, wherein:

the terminal device comprises a storage medium storing data indicative of a first geographical region over which the type of positioning assistance information to be used with the predetermined positioning scheme in determining the spatial position of the terminal device as received from the infrastructure equipment is valid; and when the terminal device moves from a coverage area of the infrastructure equipment to another coverage area of other infrastructure equipment of the wireless telecommunications network:

the receiver circuitry is configured to receive, from the other infrastructure equipment, a signal indicative of a second geographical region over which the type of positioning assistance information to be used with the predetermined positioning scheme in determining the spatial position of the terminal device as received from the other infrastructure equipment is valid; and the processing circuitry is configured:

to determine whether the first geographical region is different to the second geographical region;

when the first geographical region is different to the second geographical region, to control the receiver circuitry to receive, from the other infrastructure equipment, a signal comprising further positioning assistance information for allowing the spatial position of the terminal device to be determined using the further positioning assistance information and the predetermined positioning scheme.

9. A terminal device according to claim 8, wherein the infrastructure equipment is configured:

to receive, from a data processing apparatus of the network, the positioning assistance information; and to transmit, to the other infrastructure equipment, further positioning assistance information, the further positioning assistance information being based on the received positioning assistance information.

10. A terminal device according to claim 1, wherein the geographical region over which the type of positioning assistance information to be used with the predetermined positioning scheme in determining the spatial position of the terminal device as received from the infrastructure equipment is valid is different to a coverage area of the infrastructure equipment.

11. A terminal device according to claim 1, wherein, when the received positioning assistance information is no longer temporally valid, the processing circuitry is configured to control the receiver circuitry to receive, from infrastructure equipment of the wireless telecommunications network, a signal comprising further positioning assistance information for allowing a spatial position of the terminal device to be determined using the further positioning assistance information and the predetermined positioning scheme.

12. A terminal device according to claim 11, wherein the processing circuitry is configured:

to determine, using a predetermined characteristic associated with the terminal device, whether it is acceptable for the spatial position of the terminal device to continue to be determined using the positioning assistance information which is no longer temporally valid;

when it is determined that it is acceptable for the spatial position of the terminal device to continue to be determined using the positioning assistance information which is no longer temporally valid, to control the receiver circuitry to receive the signal comprising the further positioning assistance information from infrastructure equipment of the wireless telecommunications network only after a delay period.

13. A terminal device according to claim 1, wherein the SIB comprising the positioning assistance information is broadcasted by the infrastructure equipment.

14. A terminal device according to claim 1, wherein:

the terminal device comprises transmitter circuitry; and the SIB comprising the positioning assistance information is transmitted by the infrastructure equipment in response to the transmitter circuitry transmitting a signal to the infrastructure equipment requesting the SIB comprising the positioning assistance information.

15. Infrastructure equipment for use with a wireless telecommunications network, the infrastructure equipment comprising transmitter circuitry configured to transmit, to a terminal device of the wireless telecommunications network, a signal comprising positioning assistance information for allowing a spatial position of the terminal device to be determined using the positioning assistance information and a predetermined positioning scheme associated with the positioning assistance information, the positioning scheme comprising one or more of instructions and additional information for determining the position of the terminal device using the positioning assistance information, wherein the positioning assistance information is comprised within a system information block (SIB) of the transmitted signal, wherein the SIB is associated with a characteristic indicative to the terminal device of a temporal validity of the transmitted positioning assistance information so as to allow the terminal device to determine, at a time at which the received positioning assistance information is temporally valid, the spatial position of the terminal device using the received positioning assistance information and the predetermined positioning scheme, wherein the positioning assistance information is one of a plurality of different types of positioning assistance information, wherein each said type of positioning assistance information is associated with a respective temporal validity, and wherein the characteristic indicative to the terminal device of a temporal validity of the transmitted positioning assistance information is the type of positioning assistance information, and the type of the positioning assistance information is associated with a time corresponding to the respective temporal validity for determining the temporal validity of the positioning assistance information of the type to be used with the predetermined positioning scheme in determining the spatial position of the terminal device.

16. Infrastructure equipment according to claim 15, wherein:

the positioning assistance information is one of the plurality of types of positioning assistance information, each said type of positioning assistance information being for determining the spatial position of the terminal device using a respective positioning scheme, the positioning scheme of each said type of positioning assistance information comprising one or more of instructions and additional information for determining the position of the terminal device using that type of positioning assistance information;

the SIB of the transmitted signal is one of a plurality of transmittable SIBs receivable by the terminal device, each of the plurality of transmittable SIBs comprising one or more of the plurality of types of positioning assistance information each of which are associated with the same temporal validity; and the characteristic of the SIB of the transmitted signal includes an identifier which distinguishes the SIB of the transmitted signal from each of the other transmittable SIBs.

17. Infrastructure equipment according to claim 16, wherein:

the positioning assistance information is associated with a respective geographical region over which the positioning assistance information of that type is valid;

each of the plurality of receivable SIBs comprises one or more of the plurality of types of positioning assistance information eta plurality of which are associated with the same geographical region.

18. Infrastructure equipment according to claim 16, wherein the identifier which distinguishes the SIB of the transmitted signal from each of the other transmittable SIB s is a number indicative of a type of the SIB of the transmitted signal.

19. Infrastructure equipment according to claim 15, wherein:

the SIB of the transmitted signal comprises each of the plurality of types of positioning assistance information, each said type of positioning assistance information being for use by the terminal device in determining the spatial position of the terminal device using a respective positioning scheme, the positioning scheme of each type of positioning assistance information comprising one or more of instructions and additional information for determining the position of the terminal device using that type of positioning assistance information, and each type of positioning assistance information being associated with respective data of the SIB indicating the time for determining the temporal validity positioning assistance information of that type.

20. A terminal device for use with a wireless telecommunications network, the terminal device comprising:

receiver circuitry configured to receive, from infrastructure equipment of the wireless telecommunications network, a signal comprising positioning assistance information for allowing a spatial position of the terminal device to be determined using the positioning assistance information and a predetermined positioning scheme associated with the positioning assistance information, the positioning scheme comprising one or more of instructions and additional information for determining the position of the terminal device using the positioning assistance information, wherein the positioning assistance information is comprised within a system information block (SIB) of the received signal; and processing circuitry configured:

to determine a characteristic of the SIB and a geographical region over which the received positioning assistance information is valid, and to determine, when the terminal devices is located within the geographical region over which the received positioning assistance information is valid, the spatial position of the terminal device using the received positioning assistance information and the predetermined positioning scheme, wherein the positioning assistance information is one of a plurality of different types of positioning assistance information, wherein each said type of positioning assistance information is associated with a respective temporal validity, and wherein the characteristic of the SIB of the received signal is the type of positioning assistance information, and the type of the positioning assistance information is associated with a time corresponding to the respective temporal validity for determining the temporal validity of the positioning assistance information of the type to be used with the predetermined positioning scheme in determining the spatial position of the terminal device.

* * * * *